United States Patent [19]

Smith et al.

[11] Patent Number: 5,326,151
[45] Date of Patent: Jul. 5, 1994

[54] SEAT COVER MEMBER WITH CABLE TIE CLOSURE

[75] Inventors: William M. Smith, Allen Park; Marie T. Brooks, Pinckney, both of Mich.

[73] Assignee: Hoover Universal, Inc., Plymouth, Mich.

[21] Appl. No.: 944,987

[22] Filed: Sep. 15, 1992

[51] Int. Cl.$^5$ .............................................. A47C 31/00
[52] U.S. Cl. .................................. 297/219.1; 297/218; 297/220
[58] Field of Search .................. 297/218, 219.1, 220; 24/16 PB, 30.5 P

[56] References Cited

U.S. PATENT DOCUMENTS

| | | | |
|---|---|---|---|
| 1,054,033 | 2/1913 | Ritter | 297/220 |
| 2,151,628 | 3/1939 | Van Derveer | 297/218 |
| 2,161,448 | 6/1939 | Bishop | 297/219 |
| 2,575,548 | 11/1951 | Carter | 297/219 |
| 3,003,816 | 10/1961 | Wilson | 297/219 |
| 4,236,280 | 12/1980 | Kreiseder | 24/16 PB |
| 4,396,227 | 8/1983 | Neilson | 297/219 |
| 4,407,756 | 9/1977 | Ney | 297/219 |
| 5,023,125 | 6/1991 | Gray | 297/219 |

FOREIGN PATENT DOCUMENTS 59912 3/1988 Japan ............................... 297/220

*Primary Examiner*—Flemming Saether
*Attorney, Agent, or Firm*—Harness, Dickey & Pierce

[57] ABSTRACT

A cover member for a vehicle seat component in which the opening the cover member is closed by the use of a cable tie having integral fastening features. The cable tie and a portion of the cover member material is gathered around a protruding frame member of the seat component, providing a secure, yet neat appearing closure for the cover member.

8 Claims, 3 Drawing Sheets

SEAT COVER MEMBER WITH CABLE TIE CLOSURE

BACKGROUND AND SUMMARY OF THE INVENTION

The present invention relates generally to vehicle seat assemblies and in particular to a cover member for a seat assembly component in which the open end of the cover member is closed using a conventional cable tie having integral closure means.

In the production of seat assemblies, particularly with respect to the seat back and headrest pad, it is necessary for the cover member to be secured around a mounting post or frame member that extends from the seat cushion or headrest. This presents a difficulty in providing the finished appearance to the cover member. It is necessary that the opening in the cover member be sufficiently large for the foam pad and necessary component structure to be inserted into the cover member. After the foam pad has been inserted into the cover member, the opening must be closed in a fashion providing a secure attachment of the cover member and to completely enclose the foam pad. At the same time, the cover member must have an attractive appearance. To provide a large enough opening for assembly, there is often additional material that must be dealt with to provide a tight fit for the cover member.

Possible ways of accommodating this additional material include elastic, snap fasteners or hook and loop fasteners such as VELCRO. However, each of these methods have their own drawbacks. With elastic, durability of the elastic attachment is a concern as well as the inability to control how the fabric material is gathered by the elastic. With snap fasteners, extensive labor is required to attach the fastener elements to the trim cover and, once assembled, it is relatively easy for the snap fasteners to be unfastened. With VELCRO, the attachment can be easily unfastened as well.

Accordingly, it is an object of the present invention to provide a simple, yet reliable, means for securing the cover member of a seat component.

It is a further objective of the present invention to provide a closure for the cover member around an extending frame or mounting member.

It is a feature of the present invention to utilize a conventional cable tie to draw the cover member around a protruding mounting structure. The self locking features of the cable tie enables a loop to be formed of any desired circumference. Closing of the cover member around a protruding mounting structure is made easy, quick and reliable. Furthermore, the cover member is left tight and neat in its appearance.

Further objects, features and advantages of the invention will become apparent from a consideration of the following description and the appended claims when taken in connection with the accompanying drawings.

DETAILED DESCRIPTION OF THE INVENTION

Figure 1:
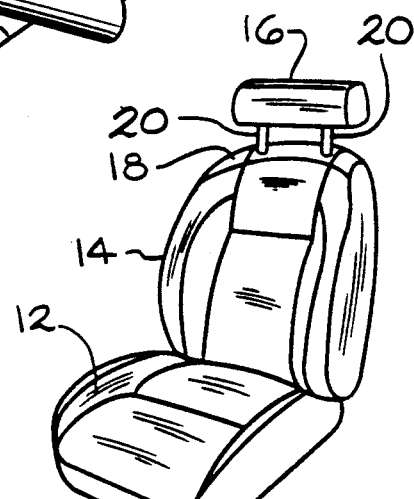
FIG. 1 is a perspective view of a seat assembly including a cover member with a cable tie closure according to the present invention.

A vehicle seat assembly as shown in FIG. 1 and designated generally at 10 includes a cover member with a cable tie closure according to the present invention. The seat assembly 10 includes a lower seat cushion 12, a seat back 14 extending generally upwardly at the rear of the seat cushion 12 and a headrest 16 mounted to the upper end 18 of the seat back. The headrest 16 is mounted to the seat back by a pair of support posts 20 extending from the headrest 16 into the seat back.

In a typical seat construction, the seat cushion, seat back and headrest are each comprised of a foam body with supporting structural members and are covered by a cover member that is fabric, vinyl, leather or other sheet type material. During manufacture of the seat assembly 10, the cover members are formed by one or more pieces of the sheet material folded and/or sewn together to form an envelope having an open end through which the foam body and structure of the seat component is inserted. For both the seat back and the headrest, it is necessary for the open end of the cover member to be closed after the cover member has been placed around the foam pad. Closing the cover member is to both protect the foam pad as well as to provide a finished appearance to the seat component.

To provide an opening in the cover member that is large enough for the cover member to be easily assembled around the foam pad, it is typically necessary to provide extra material around the opening that must be gathered together to provide a tight fit for the cover member when closed. The present invention uses a cable tie to draw the cover member around a protruding frame member to secure the cover member.

Figure 2:
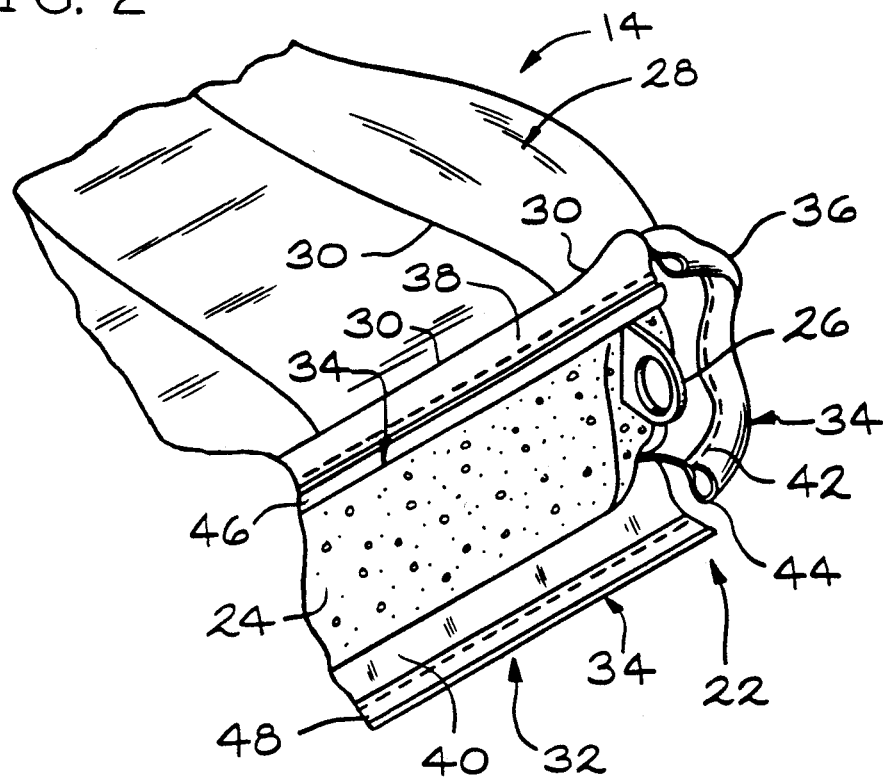
FIG. 2 is a fragmentary perspective view of the lower end of the seat back showing the cover member open without the cable tie closure.
Figure 3:
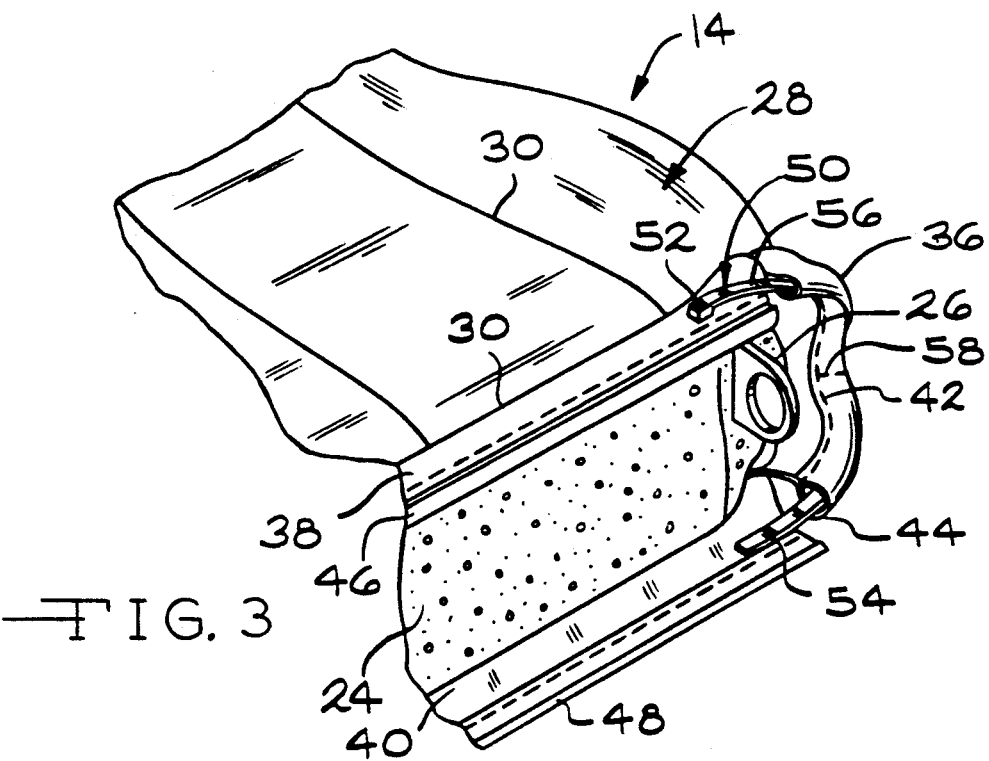
FIG. 3 is a perspective view similar to FIG. 2 with the cable tie closure in place.
Figure 4:
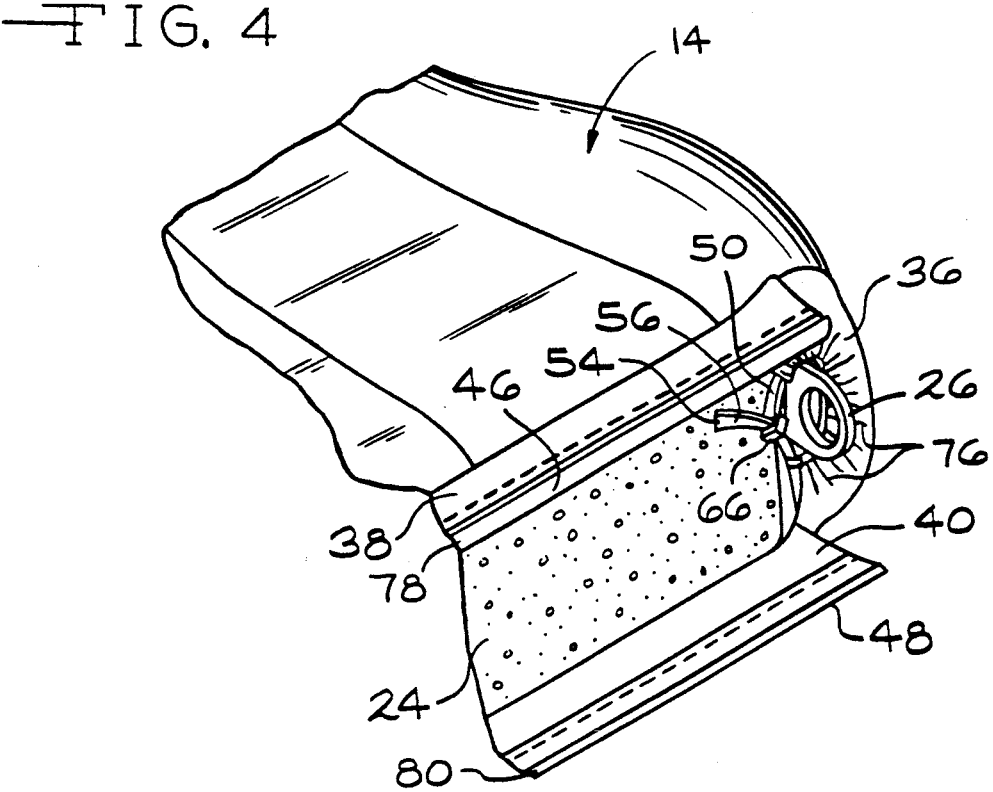
FIG. 4 is a perspective view similar to FIG. 3 with the cable tie closed, drawing the cover member around the protruding seat back frame member.

With reference to FIGS. 2-5, the cable tie closure is described in connection with the closing of the open lower end of the seat back cover member around the seat back frame members. The lower end 22 of the seat back 14 is shown in FIG. 2 illustrating the construction of the seat back. The seat back includes a foam pad 24 as well as a frame structure shown by the bracket 26 extending from the foam pad. The foam pad is covered by a cover member 28 that is formed by a plurality of pieces of a sheet material sewn together at seams 30 to form an envelope for the seat back. The envelope has an open lower end 32 formed by a peripheral edge 34 of the cover member. The peripheral edge is formed by a side gusset 36, a front bottom facing 38, sometimes referred to here as the front gusset 38, a rear bottom facing 40, sometimes referred to here as the rear gusset 40, and another side gusset (not shown) like the side gusset 36 at the other side of the seat back.

The edge of the side gusset 36 is hemmed by stitching 42 forming a channel 44 along the peripheral edge 34 of the cover member open lower end. The front and rear bottom facings 38 and 40 respectively are finished with elongated strips of complementary J-clips 46 and 48 for closing of the cover member between the two frame brackets 26 (only one shown) extending from the bottom of the seat back. The use of long J-clips or other fasteners such as zippers is well known, in the art for closing the lower end of the cover member between the extending frame members. The difficulty in closing the cover member occurs at the outer edge with the two side gussets where sufficient material must be provided to enable assembly of the seat back, yet the cover member must be securely closed and trimmed around the protruding frame member.

A plastic cable tie 50 (FIG. 3) is inserted into the channel 44 with the ends 52 and 54 of the cable tie extending from opposite ends of the channel 44. The stiffness of the elongated body portion 56 of the cable tie, between the two ends, enables the cable tie to be fed through the channel 44 after the side gusset has been hemmed. However, it is also possible to sew the hem around the cable tie 50. If desired, optional stitching 58 can be used to sew the cable tie into the channel 44 to prevent its withdrawal from the channel.

Figure 6:
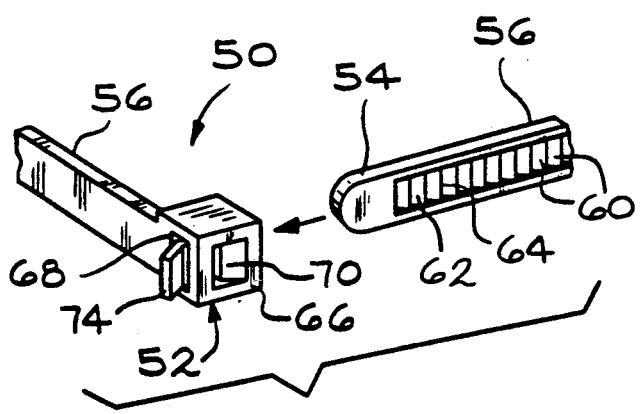
FIG. 6 is a perspective view of the cable tie closure showing the closure in greater detail.

The cable tie 50 is shown in greater detail in FIG. 6. A plurality of teeth 60 are provided on one side of the body portion 56 and extend transversely across the elongated body 56. The teeth 60 are shaped on one side with a ramped surface 62 and on the other side a flat surface 64 projecting from the body portion. The end 54 is inserted into a passage 68 in a receptacle 66 at the opposite end 52 of the cable tie. A flex tab 70 extends into the passage 68 for engagement with the teeth 60 to hold the elongated body 56 in the receptacle. During insertion of the cable tie body into the passage 68, the ramped surfaces of the teeth 60 engage the tab 70 allowing the cable tie to be inserted into the receptacle to a desired location to produce a closed loop of the needed length. After insertion, the flat sides of the teeth 60 prevent withdrawal of the cable tie body from the receptacle 66. The structure enables the tie to be self closing in a secure manner. Such ties are commonly used to form wiring harnesses for automotive vehicles and to mount the wiring harnesses within the vehicle. Hence, the ties are generally referred to as cable ties, however, other self closing ties may be used as well. The cable tie 50 can include a release tang 74, extending from the flex tab 70 outwardly of the receptacle 66, to provide for selective release of the cable tie if desired.

To close the cover member open end, the cable tie 50 (FIG. 4) is first closed around the protruding seat back bracket 26 with the free end 54 and main body portion of the cable tie being inserted through the receptacle 66 to form a closed loop of the cable tie wrapped around the bracket 26. This draws the side gusset 36 tightly around the protruding bracket to secure the gusset and seat cover to the foam pad. If desired, the excess length of the cable tie body portion can be cut after the tie has been secured. The side gusset 36, will form a number of gathers 76 as it is drawn around the bracket 26.

Figure 5:
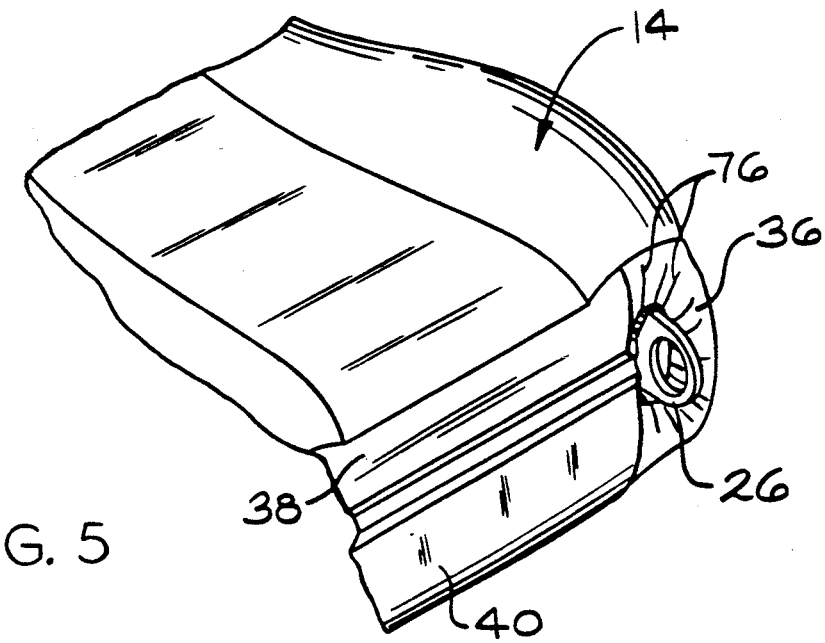
FIG. 5 is a perspective view similar to FIG. 4 showing the remainder of the cover member closed.

After the two side gussets have been secured around their respective brackets 26, as shown in FIG. 5 for one of the brackets, the front and rear gussets 38 and 40 are closed by securing the hook portion 78 of the J-hook 46 with the complementary hook portion 80 of the J-hook 48. The two J-hooks close the cover member between the protruding bracket 26 and a second protruding frame member, such as another bracket 26, on the opposite side of the seat assembly. The two brackets are used to attach the seat back to the seat cushion in a well known manner.

The cable tie 50 can be inserted into the channel after the edge of the cover member open end is hemmed or the edge can be hemmed around the cable tie. If the cover member with the cable tie will be handled extensively before final assembly of the seat component it may be desirable to close the tie to prevent it from being removed during handling. The release tang 74 is then used to release the tie for final assembly around the protruding frame member. If closure and subsequent release of the tie is not needed, then ties not having the release tang can be used.

The word channel, as used herein, is to be broadly construed. It need not be a closed channel as formed by a hem. A plurality of loops on the inner side of the cover member at the edge of the open end may be sufficient to draw the cover member up to the protruding frame member. Any similar means for attaching the cable to draw the cover member up to the frame member is intended to be included in the term channel.

Figure 7:
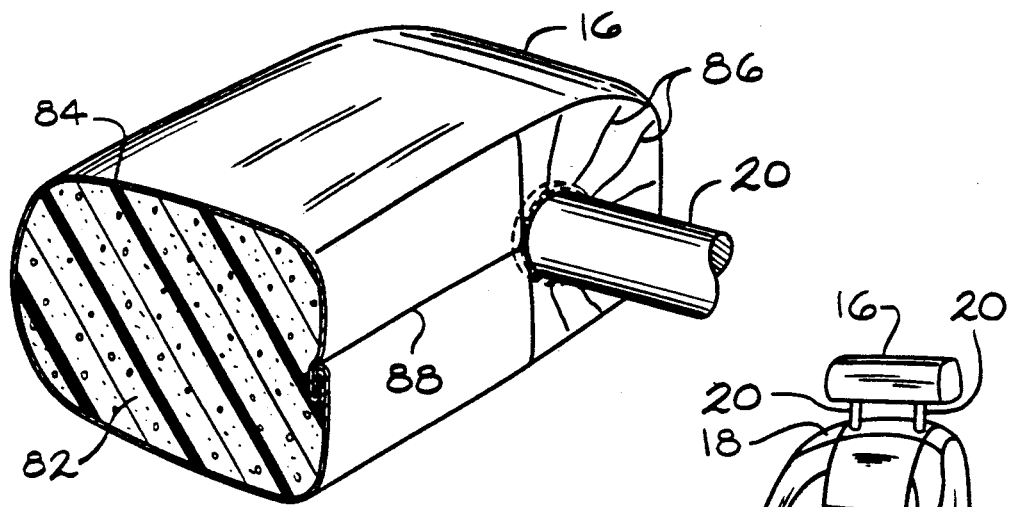
FIG. 7 is a fragmentary perspective view of the bottom of a seat assembly head rest with the cover member equipped with a cable the closure.

FIG. 7 illustrates the headrest 16 and the closure for the cover member at the bottom of the headrest. The headrest 16 includes a foam pad 82 around a headrest frame that includes the support post 20 extending from the pad. The pad 82 is covered with a cover member 84 which has an opening at the lower end of the pad that is shown closed in FIG. 6. Around the outer side of the support post 20, the cover member is shown with gathers 86 formed by the cable tie (not shown) wrapped around the support post 20. J-clip fasteners are used to close the cover member between the two support posts as shown at 88.

Figure 8:
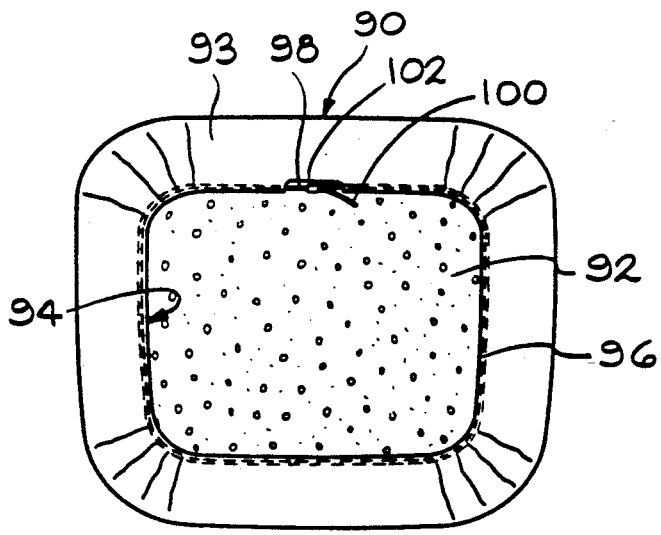
FIG. 8 is a bottom view of a seat cushion with the cover member secured with a cable tie closure.

The closure tie can also be used to secure the cover member to a foam body that does not include an extending frame member. For example, with reference to FIG. 8 the bottom of a seat cushion 90 is shown. The seat cushion 90 includes a large foam pad 92 that is covered with a cover member 93. The cover member includes a large opening 94 for insertion of the foam pad therein. The peripheral edge 96 of the opening 94 is hemmed, forming a channel through which a cable tie 98 is inserted. The end 100 of the cable tie is inserted through the receptacle 102 at the opposite end to secure the cable tie and draw the opening 94 around the foam pad 92. This reduces the size of the opening 94 to prevent the foam pad from being withdrawn from the cover member.

In this application, the cable tie is used to replace a wire or paper cord which has been used around the periphery of the cover member. The ends of the wire must be attached to the cushion frame in a separate operation while the paper cord must be tied in a separate operation. This additional operation has been eliminated by use of the cable tie which includes integral means for attaching the ends of the cable tie.

The cable tie closure for a cover member of the present invention provides a simple, yet very effective, way for closing the cover member of a seat component which provides for secure attachment of the cover member and does so with a neat appearance. Furthermore, the cable tie provides the needed durability to the closure not found in other methods such as elastic, snaps or VELCRO fasteners.

It is to be understood that the invention is not limited to the exact construction illustrated and described above, but that various changes and modifications may be made without departing from the spirit and scope of the invention as defined in the following claims.

We claim:

1. A cover member for an article having a protuberance extending therefrom comprising:

one or more pieces of a sheet material joined together to form an envelope having a peripheral edge at an open end through which said article is inserted into said envelope with said protuberance extending from said envelope through said open end; and means for closing said open end around said article and said protuberance with said protuberance extending through said open end, said closing means including a channel along a portion of said peripheral edge having first and second ends, a closure strap within said channel having an elongated body portion and first and second ends extending from the ends of said channel, said closure strap being tightly wrapped around said protuberance, said strap having a receptacle at said first end with a passage therethrough and a flexible locking tab extending into said passage and said strap body portion having a plurality of teeth transverse to the length of said body portion for engagement with said flexible tab when said body is inserted into said passage to hold said body portion in said housing forming a closed loop of desired length whereby said portion of said peripheral edge is drawn tightly around said protuberance.

2. The cover member of claim 1 wherein said flexible tab can be disengaged from said transverse teeth to enable said body portion to be removed from said housing.

3. The cover member of claim 1 wherein said article is a vehicle seat back having a lower end with a frame member extending from said lower end forming said protuberance with said closure strap being wrapped against said frame member to draw said portion of said peripheral edge against said frame member.

4. The cover member of claim 1 wherein said article is a head rest for a vehicle seat assembly having a lower end and at least one mounting post extending from said lower end forming said protuberance with said closure strap being wrapped against said post to draw said portion of said peripheral edge against said post.

5. The cover member of claim 1 wherein said channel is formed by a hem in said portion of said peripheral edge.

6. The cover member of claim 1 further comprising stitching to sew said closure strap into said channel.

7. A component for a seat assembly comprising:

an article having an end and a pair of spaced mounting members extending from said end of said article;

a cover member for covering said article including one or more pieces of a sheet material joined together to form an envelope having a peripheral edge forming an open end of said envelope through which said article is inserted into said envelope with said mounting members extending from said article through said open end; and means for closing said open end around said article and said mounting members with said mounting members extending through said open end, said closing means including first and second portions of said peripheral edge each having a channel at said edge and each channel having opposite ends, a pair of closure straps, one of said closure straps in each of said channels, said closure straps each having a an elongated body portion and first and second ends extending from said opposite ends of said channels, each closure strap being wrapped around one of said mounting members extending from said article, said elongated body portions of said closure straps and said first ends of said closure straps including coacting means for securing said body portions to said first ends forming a closed loop of desired length of each closure strap wrapped around each mounting member whereby said first and second portions of said peripheral edge are drawn against said mounting members.

8. The cover member of claim 7 wherein said peripheral edge includes third and fourth portions generally located between said two spaced mounting members, said third and fourth portions including coacting means to couple said third and fourth portions together between said spaced mounting members to cover said article.

* * * * *